US012669643B2

(12) United States Patent
Lo et al.

(10) Patent No.: US 12,669,643 B2
(45) Date of Patent: Jun. 30, 2026

(54) SEMICONDUCTOR DEVICE WITH WAVEGUIDE STRUCTURE AND METHOD FOR MANUFACTURING THE SAME

(71) Applicant: TAIWAN SEMICONDUCTOR MANUFACTURING COMPANY, LTD., Hsinchu (TW)

(72) Inventors: Wei-Li Lo, Hsinchu (TW); Huan-Chieh Chen, Hsinchu (TW); Yao-Wen Chang, Hsinchu (TW); Chih-Ming Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 423 days.

(21) Appl. No.: 18/172,907

(22) Filed: Feb. 22, 2023

(65) Prior Publication Data

US 2024/0151900 A1     May 9, 2024

Related U.S. Application Data

(60) Provisional application No. 63/423,153, filed on Nov. 7, 2022.

(51) Int. Cl.
| | |
|---|---|
| *G02B 6/12* | (2006.01) |
| *G02B 6/122* | (2006.01) |
| *G02B 6/136* | (2006.01) |

(52) U.S. Cl.
CPC ..... *G02B 6/12004* (2013.01); *G02B 6/12002* (2013.01); *G02B 6/1228* (2013.01); *G02B 6/136* (2013.01); *G02B 2006/12169* (2013.01)

(58) Field of Classification Search
CPC ............ G02B 6/12004; G02B 6/12002; G02B 6/1228; G02B 6/136
See application file for complete search history.

(56) References Cited

U.S. PATENT DOCUMENTS

| | | | | |
|---|---|---|---|---|
| 9,105,490 | B2 * | 8/2015 | Wang .................. | H10W 20/048 |
| 10,197,730 | B1 * | 2/2019 | Ngu .................... | G02B 6/12002 |
| 11,302,798 | B2 * | 4/2022 | Chuang ............. | H10D 84/0147 |
| 2018/0005876 | A1 * | 1/2018 | Tung ................. | H01L 23/53295 |
| 2021/0249310 | A1 * | 8/2021 | Chou ................... | H10D 84/038 |
| 2025/0167042 | A1 * | 5/2025 | Lo ....................... | H01L 21/7682 |

* cited by examiner

*Primary Examiner* — Tina Wong
(74) *Attorney, Agent, or Firm* — Birch, Stewart, Kolasch & Birch, LLP

(57) ABSTRACT
A method for manufacturing a semiconductor device includes: forming a first waveguide structure and a second waveguide structure on a substrate in which the first waveguide structure and the second waveguide structure is spaced apart from each other by a recess; conformally forming an un-doped dielectric layer to cover the first and second waveguide structures and to form a gap between two corresponding portions of the un-doped dielectric layer laterally covering the first waveguide structure and the second waveguide structure, respectively; and forming a doped filling layer to fill the gap.

20 Claims, 9 Drawing Sheets

100

SEMICONDUCTOR DEVICE WITH WAVEGUIDE STRUCTURE AND METHOD FOR MANUFACTURING THE SAME

REFERENCE TO RELATED APPLICATION

This application claims priority of U.S. Provisional Application No. 63/423,153 filed on Nov. 7, 2022, the contents of which is incorporated herein by reference in its entirety.

BACKGROUND

Photonic waveguides such as silicon waveguides or the like are of great interest in the semiconductor industry, due to their unique guiding properties. The photonic waveguides are used to confine and guide light from a first point on, for example, an integrated chip (IC), to a second point on the IC with minimal attenuation. The photonic waveguides can be used for communication, interconnection, or the like.

The capability of filling a dielectric material into gaps or recesses formed among the photonic waveguides is a key to decide critical dimension (CD) widths among the photonic waveguides and the size of a semiconductor device containing the photonic waveguides. The dielectric material filled by a common filling process such as a high density plasma process and/or a high aspect ratio process may generate cracks, voids, or the like, due to a great amount of thermal stress produced in a subsequent thermal process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
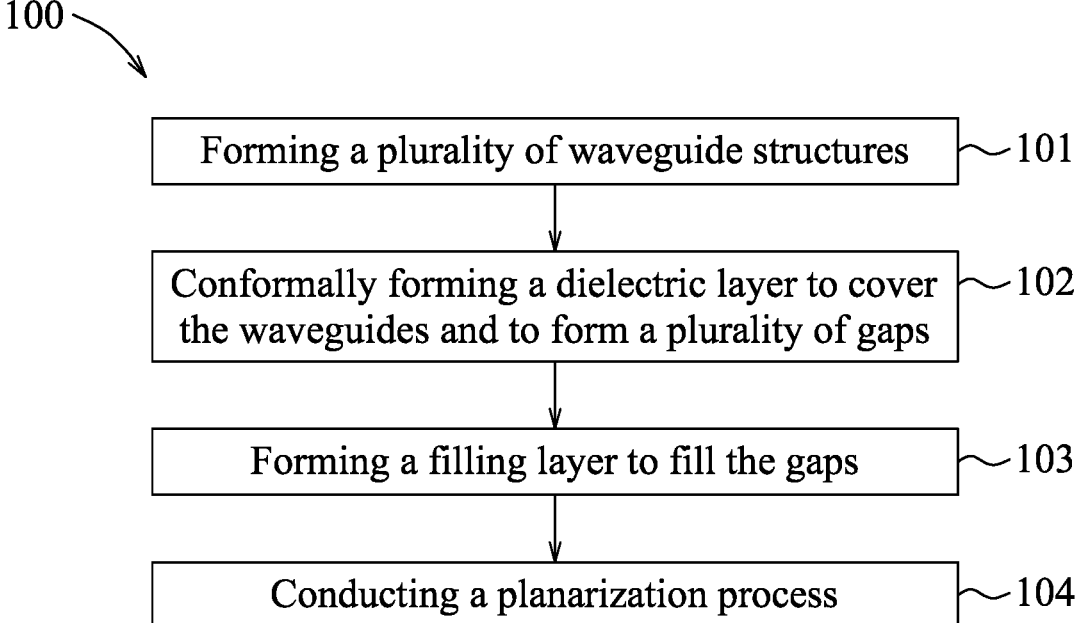
FIG. 1 is a flow diagram illustrating a method for manufacturing a semiconductor device in accordance with some embodiments.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "upper," "lower," "upwardly," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is directed to a semiconductor device in which a spacer formed between two adjacent ones of waveguide structures includes a doped dielectric body and an un-doped dielectric layer covering sidewall surfaces of the doped dielectric body, and is also directed to a method for manufacturing the semiconductor device. FIG. 1 is a flow diagram illustrating a method 100 for forming a semiconductor device in accordance with some embodiments. FIGS. 2 to 5 are schematic views illustrating some intermediate stages of the method as depicted in FIG. 1 in accordance with some embodiments. Some portions may be omitted in FIGS. 2 to 5 for the sake of brevity. Additional steps can be provided before, after or during the method 100, and some of the steps described herein may be replaced by other steps or be eliminated.

Figure 2:
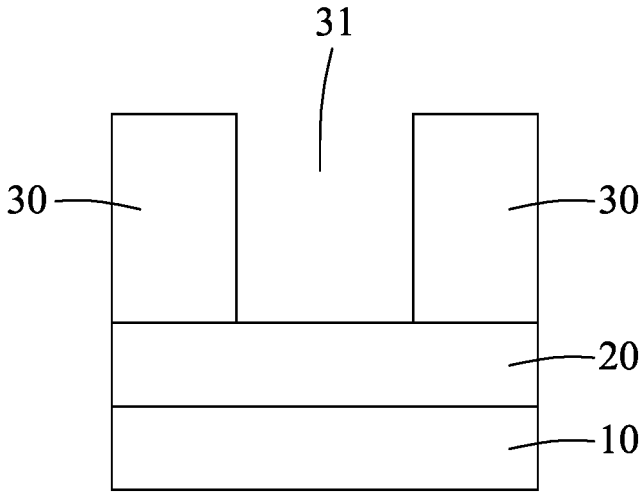
FIGS. 2 to 5 are schematic views illustrating some intermediate stages of the method as depicted in FIG. 1 in accordance with some embodiments.

Referring to FIG. 1 and the example illustrated in FIG. 2, the method 100 begins at step 101, where a plurality of waveguide structures are formed on a substrate. FIG. 2 is a schematic view illustrating formation of a plurality of waveguide structures 30 on a substrate 10. Two of the waveguide structures 30 are shown in FIG. 2. In some embodiments, the waveguide structures 30 may include silicon waveguides, silicon nitride waveguides, or the like. In some embodiments, the waveguide structures 30 includes the silicon waveguides.

In some embodiments, the substrate 10 may be a semiconductor substrate. In some embodiments, the semiconductor substrate may include, for example, but not limited to, an elemental semiconductor or a compound semiconductor. An elemental semiconductor includes a single species of atoms, such as silicon (Si) or germanium (Ge) in column XIV of the periodic table, and may be in crystal, polycrystalline, or an amorphous form. Other suitable materials are within the contemplated scope of the present disclosure. A compound semiconductor includes two or more elements, and examples thereof may include, but not limited to, silicon carbide (SiC), gallium arsenide (GaAs), gallium phosphide (GaP), indium phosphide (InP), indium arsenide (InAs), indium antimonide (InSb), silicon germanium (SiGe), gallium arsenide phosphide (GaAsP), aluminum indium arsenide (AlInAs), aluminum gallium arsenide (AlGaAs), gallium indium arsenide (GaInAs), gallium indium phosphide (GaInP), and gallium indium arsenide phosphide (GaInAsP). Other suitable materials are within the contemplated scope of the present disclosure. The compound semiconductor may have a gradient feature in which the composition ratio thereof changes from one location to another location in the compound semiconductor. The compound semiconductor may be formed over a silicon substrate and may be strained. In some embodiments, the semiconductor substrate 10 may include a multilayer compound semiconductor structure.

A first dielectric layer 20 is formed on the substrate 10. In some embodiments, the first dielectric layer 20 overlies the substrate 10. In some embodiments, the first dielectric layer 20 is in direct contact with an upper surface of the substrate 10. In some embodiments, the first dielectric layer 20 may include a suitable low-k (low dielectric constant) material (for example, but not limited to, silicon oxide (SiOx), silicon nitride (SiNx), silicon oxynitride (SiON), silicon carbonitride (SiCN), silicon oxycarbide (SiOC), silicon oxycarbonitride (SiOCN), silicon carbide (SiC), or other low-k dielectric materials). Other suitable materials are within the contemplated scope of the present disclosure. In some embodiments, the first dielectric layer 20 may be a bottom oxide (BOX) layer. In some embodiments, the first dielectric layer 20 may be formed on the substrate 10 by a suitable deposition process as is known to those skilled in the art of semiconductor fabrication (for example, but not limited to, chemical vapor deposition (CVD), plasma-enhanced CVD (PECVD), low pressure CVD (LPCVD), ultrahigh vacuum CVD (UVCVD), reduced pressure CVD (RPCVD), atomic layer deposition (ALD), plasma-enhanced ALD (PEALD), physical vapor deposition (PVD), sputtering, spin coating, or the like). Other suitable formation processes are within the contemplated scope of the present disclosure. In some embodiments, the first dielectric layer 20 may have a thickness ranging from about 3,000 angstroms (Å) to about 40,000 Å. Other suitable values of the thickness are within the contemplated scope of the present disclosure.

A waveguide-forming material layer (not shown) is formed on the first dielectric layer 20. In some embodiments, the waveguide-forming material layer overlies the first dielectric layer 20. In some embodiments, the waveguide-forming material layer is in direct contact with an upper surface of the first dielectric layer 20. In some embodiments, the waveguide-forming material layer may include silicon (Si), silicon nitride (SiNx), or the like, or combinations thereof. In some embodiments, the waveguide-forming material layer includes Si. In some embodiments, the waveguide-forming material layer may have a thickness ranging from about 1,000 Å to about 40,000 Å. Other suitable values of the thickness of the waveguide-forming material layer are within the contemplated scope of the present disclosure.

In some embodiments, the waveguide-forming material layer is patterned to form the waveguide structures 30. In some embodiments, the waveguide-forming material layer may be patterned to form the waveguide structures 30 by the following processes. Other suitable patterning processes are within the contemplated scope of the present disclosure.

A mask layer (for example, a hard mask layer, not shown) is deposited on the waveguide-forming material layer. In some embodiments, the mask layer may include, for example, but not limited to, tungsten nitride, tungsten carbide, titanium nitride, zirconium oxide, aluminum oxide, yttrium oxide, aluminum oxynitride, hafnium oxide, hafnium zirconium oxide, hafnium silicon oxide, hafnium silicon oxynitride, zirconium silicon oxide, hafnium zirconium silicon oxide, hafnium aluminum oxide, hafnium aluminum nitride, zirconium aluminum oxide, ytterbium oxide, or combinations thereof. Other suitable materials are within the contemplated scope of the present disclosure. The mask layer may be formed on the waveguide-forming material layer by a suitable deposition process as is known in the art of semiconductor fabrication, such as CVD, PECVD, LPCVD, UVCVD, RPCVD, ALD, PEALD, PVD, sputtering, spin coating, or the like. Other suitable techniques are within the contemplated scope of the present disclosure. A photoresist layer (not shown) is then formed on the mask layer by a suitable fabrication technique known to those skilled in the art of semiconductor fabrication, for example, but not limited to, a spin-on technique. Other suitable techniques are within the contemplated scope of the present disclosure. The photoresist layer is then patterned using a suitable photolithography technique to form a patterned photoresist layer with an opening pattern. For example, the photoresist layer is exposed to light for patterning, followed by developing to form the opening pattern. The opening pattern formed in the patterned photoresist layer is transferred to the mask layer using an etching processes, for example, but not limited to, a wet etching process, a dry etching process, a reactive ion etching process, a neutral beam etching process, or the like. Other suitable etching processes are within the contemplated scope of the present disclosure. After the opening pattern is transferred to the mask layer, the patterned photoresist layer may be removed by, for example, but not limited to, an ashing process. Other suitable removing processes are within the contemplated scope of the present disclosure. The opening pattern formed in the mask layer is then transferred to the waveguide-forming material layer using a suitable etching process, for example, but not limited to, a wet etching process, a dry etching process, or the like, so as to form the waveguide structures 30. Other suitable etching processes are within the contemplated scope of the present disclosure. After the waveguide structures 30 are formed, the mask layer may be removed using, for example, but not limited to, a planarization process (for example, but not limited to, a chemical mechanical planarization (CMP) process). Other suitable removing processes are within the contemplated scope of the present disclosure. In some embodiments, the patterned photoresist layer may be used directly as a patterned mask for conducting the etching process to form the waveguide structures 30. A plurality of recesses 31 are formed to permit two adjacent ones of the waveguide structures 30 to be spaced apart from each other by a corresponding one of the recesses 31. One of the recesses 31 is shown in FIG. 2.

Figure 3:
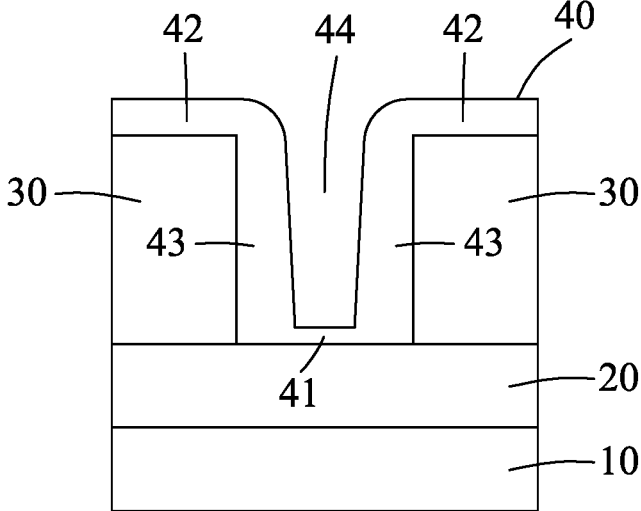

Referring to FIG. 1 and the example illustrated in FIGS. 2 and 3, the method 100 proceeds to step 102, where a second dielectric layer is conformally formed to cover the waveguides and to form a plurality of gaps. FIG. 3 is a schematic view illustrating conformal formation of a second dielectric layer 40 to cover the waveguide structures 30 and the first dielectric layer 20. The second dielectric layer 40 includes a plurality of lower portions 41, each of which is formed on a corresponding portion of the first dielectric layer 20; a plurality of upper portions 42, each of which is formed on a corresponding one of the waveguide structures 30; and a plurality of interconnecting portions 43, each of which is disposed to interconnect a corresponding one of the lower portions 41 and a corresponding one of the upper portions 42 and to laterally cover a corresponding one of the waveguide structures 30, so as to form a plurality of gaps 44, each of which is formed between two corresponding ones of the interconnecting portions 43. One of the lower portions 41, two corresponding ones of the upper portions 42, two corresponding ones of the interconnecting portions 43, and a corresponding one of the gaps 44 are shown in FIG. 3. In some embodiments, the second dielectric layer 40 may include an un-doped dielectric material. In some embodiments, the second dielectric layer 40 may include un-doped silicon oxide (SiOx). Other suitable dielectric materials are within the contemplated scope of the present disclosure. In some embodiments, the second dielectric layer 40 may have a thickness ranging from about 50 nanometers (nm) to about 300 nm.

In some embodiments, the second dielectric layer 40 may be formed by a suitable conformal deposition process as is known in the art of semiconductor fabrication, such as flowable CVD, ALD, a high aspect ratio process (HARP), or the like. Other suitable conformal deposition processes are within the contemplated scope of the present disclosure. In some embodiments, the second dielectric layer 40 is formed by the HARP. The HARP is a particular CVD process developed by Applied Materials, Inc. to address stringent gap-filling requirements. In the HARP, a thermal process is used to reduce or eliminate the damage to a semiconductor device caused by plasma and to allow the semiconductor device to have an improved reliability. In some embodiments, the second dielectric layer 40 include un-doped silicon oxide and is formed by the HARP using a silicon-containing precursor and an oxygen-containing precursor. In some embodiments, the second dielectric layer 40 has a glass transition temperature (Tg) ranging from about 1,000° C. to about 1,400° C. In some embodiments, the silicon-containing precursor may include, for example, but not limited to, tetraethyl orthosilicate (TEOS) or the like. Other suitable silicon-containing precursors are within the contemplated scope of the present disclosure. In some embodiments, the oxygen-containing precursor may include, for example, but not limited to, ozone ($O_3$), oxygen ($O_2$), or the like, or combinations thereof. Other suitable oxygen-containing precursors are within the contemplated scope of the present disclosure.

Figure 4:
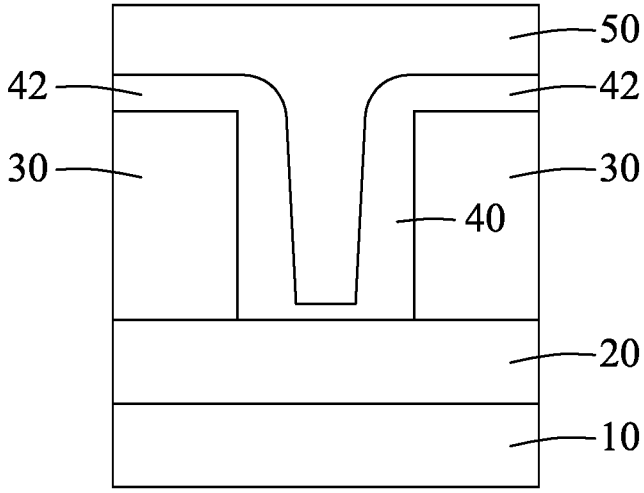

Referring to FIG. 1 and the examples illustrated in FIGS. 3 and 4, the method 100 proceeds to step 103, where a filling layer is formed to fill the gaps. FIG. 4 is a schematic view illustrating formation of a filling layer 50 to fill the gaps 44 (see FIG. 3) and to cover the second dielectric layer 40. In some embodiments, the filling layer 50 overlies the second dielectric layer 40. In some embodiments, the filing layer 50 is in direct contact with an upper surface of the second dielectric layer 40. In some embodiments, the filling layer 50 includes a doped dielectric material. In some embodiments, the filling layer 50 includes a doped silicon oxide (SiOx). Other suitable doped dielectric materials are within the contemplated scope of the present disclosure. In some embodiments, the filling layer 50 includes silicon oxide doped with boron, phosphorus, or a combination thereof. Other suitable dopants are within the contemplated scope of the present disclosure. In some embodiments in which the filling layer 50 includes silicon oxide doped with boron and phosphorus, a boron content in the filling layer 50 is greater than 0 wt % and up to 20 wt %, and a phosphorus content in the filling layer 50 is greater than 0 wt % and up to 20 wt %. In some embodiments in which the filling layer 50 includes silicon oxide doped with boron and phosphorus, the boron content in the filling layer 50 ranges from 1 wt % to 20 wt %, and the phosphorus content in the filling layer 50 ranges from 1 wt % to 20 wt %. In some embodiments, the filling layer 50 includes a silicon oxide (SiOx) matrix doped with boron and phosphorus. In some embodiments, boron doped into the silicon oxide matrix is present as boron oxide ($B_2O_3$) incorporated into the silicon oxide matrix. In some embodiments, phosphorus doped into the silicon oxide matrix is present as phosphorus oxide ($P_2O_5$) incorporated into the silicon oxide matrix. In some embodiments, the filling layer 50 has a glass transition temperature (Tg) ranging from about 500° C. to 600° C., which is significantly lower than that of the second dielectric layer 40. As described above, the second dielectric layer 40 have a thickness ranging from about 50 nm to about 300 nm. If the thickness of the second dielectric layer 40 is less than 50 nm, the second dielectric layer 40 may not serve as a barrier layer to effectively prevent boron and/or phosphorus contained in the filling layer 50 from diffusing into the waveguide structures 30 and the first dielectric layer 20. If the thickness of the second dielectric layer 40 is greater than 300 nm, the gaps 44 to be filled with the filling layer 50 may not be formed.

In some embodiments, the filling layer 50 may be formed to fill the gaps 44 by a sub-atmospheric CVD, or the like. In some embodiments in which the filling layer 50 includes silicon oxide (SiOx) doped with boron and phosphorus, the sub-atmospheric CVD is conducted by the HARP using a silicon-containing precursor, an oxygen-containing precursor, and at least one of a boron-containing precursor and a phosphorus-containing precursor. In some embodiments, the sub-atmospheric CVD is conducted by the HARP using the silicon-containing precursor, the oxygen-containing precursor, the boron-containing precursor, and the phosphorus-containing precursor. In some embodiments, the silicon-containing precursor may include tetraethyl orthosilicate (TEOS). Other suitable silicon-containing precursors are within the contemplated scope of the present disclosure. In some embodiments, the oxygen-containing precursor may include ozone ($O_3$), oxygen ($O_2$), or a combination thereof. Other suitable oxygen-containing precursors are within the contemplated scope of the present disclosure. In some embodiments, the boron-containing precursor may include triethyl borate. Other suitable boron-containing precursors are within the contemplated scope of the present disclosure. In some embodiments, the phosphorus-containing precursor may include triethyl phosphate. Other suitable phosphorus-containing precursors are within the contemplated scope of the present disclosure. In some embodiments, the filling layer 50, which is formed by using TEOS, $O_3$, triethyl borate, and triethyl phosphate as the silicon-containing precursor, the oxygen-containing precursor, the boron-containing precursor, and the phosphorus-containing precursor, respectively, may include borophosphosilicate glass (BPSG). As described above, the filling layer 50 has a substantially low glass transition temperature (Tg) (for example, but not limited to, from about 500° C. to 600° C.) compared to that (for example, but not limited to, from about 1,000° C. to about 1,400° C.) of the second dielectric layer 40. A filling material (for example, but not limited to, BPSG) for forming the filling layer 50 is in a flowable form during the sub-atmospheric CVD, such that the gaps 44 can be fully filled with the filling layer 50 without formation of voids.

Figure 5:
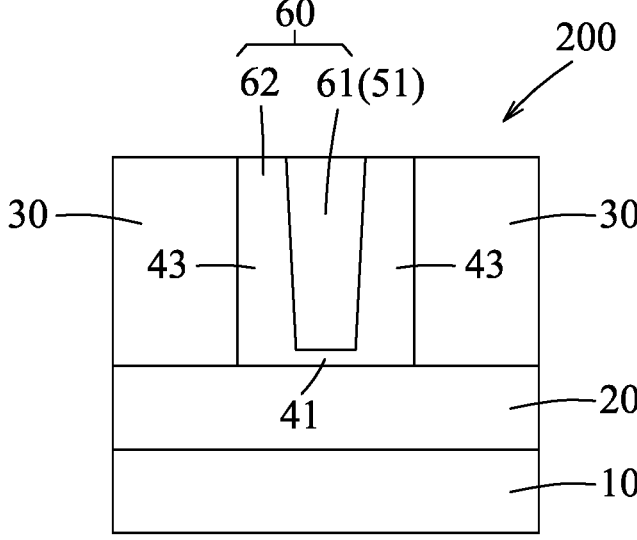

Referring to FIG. 1 and the example illustrated in FIGS. 4 and 5, the method 100 proceeds to step 104, where a planarization process is conducted. FIG. 5 is a schematic view illustrating a semiconductor device 200, which includes a filling portion 51 formed between two corresponding ones of the interconnecting portions 43 after the planarization process. In some embodiments, the planarization process may be conducted by CMP or the like to remove an upper portion of the filling layer 50 and the upper portions 42 of the second dielectric layer 40 over the waveguide structures 30 so that the semiconductor device 200 is formed with a plurality of spacers 60, each of which is disposed to separate two corresponding ones of the waveguide structures 30 from each other. One of spacers 60 is shown in FIG. 5. Each of the spacers 60 includes a doped dielectric body 61 and an un-doped dielectric layer 62 disposed to separate the doped dielectric body 61 from two corresponding ones of the waveguide structures 30 and the first dielectric layer 20 and to cover two opposite sidewall surface of a bottom surface of the doped dielectric body 61. The doped dielectric body 61 is formed by the filling portion 51, and the un-doped dielectric layer 62 is formed by two corresponding ones of the interconnecting portions 43 and a corresponding one of the lower portion 41 of the second dielectric layer 40. In some embodiments, the doped dielectric body 61 includes a doped dielectric material. In some embodiments, the doped dielectric body 61 includes a dielectric material doped with a dopant selected from boron, phosphorus, or a combination thereof. In some embodiments, the doped dielectric body 61 includes a doped silicon oxide (SiOx). In some embodiments, the doped dielectric body 61 includes silicon oxide (SiOx) doped with boron, phosphorus, or a combination thereof. In some embodiments in which the doped dielectric body 61 includes silicon oxide doped with boron and phosphorus, a boron content in the doped dielectric body 61 is greater than 0 wt % and up to 20 wt %, and a phosphorus content in the doped dielectric body 61 is greater than 0 wt % and up to 20 wt %. In some embodiments in which the doped dielectric body 61 includes silicon oxide doped with boron and phosphorus, the boron content in the doped dielectric body 61 ranges from 1 wt % to 20 wt %, and the phosphorus content in the doped dielectric body 61 ranges from 1 wt % to 20 wt %. In some embodiments, the un-doped dielectric layer 62 includes an un-doped dielectric material. In some embodiments, the un-doped dielectric layer 62 includes un-doped silicon oxide (SiOx).

In some embodiments, after formation of the spacers 60 among the waveguide structures 30, the waveguide structures 30 may be subjected to an annealing process to reduce surface roughness of the waveguide structures 30 so as improve a light propagation performance of the waveguide structures 30. In some embodiments, the annealing process may be conducted at a temperature ranging from about 600° C. to about 1200° C. Other suitable values of the temperature for conducting the annealing process are within the contemplated scope of the present disclosure. In some embodiments, the annealing process may be conducted for a time period ranging from about 0.5 minute to about 60 minutes. Other values of the time period for conducting the annealing process are within the contemplated scope of the present disclosure.

Figure 6:
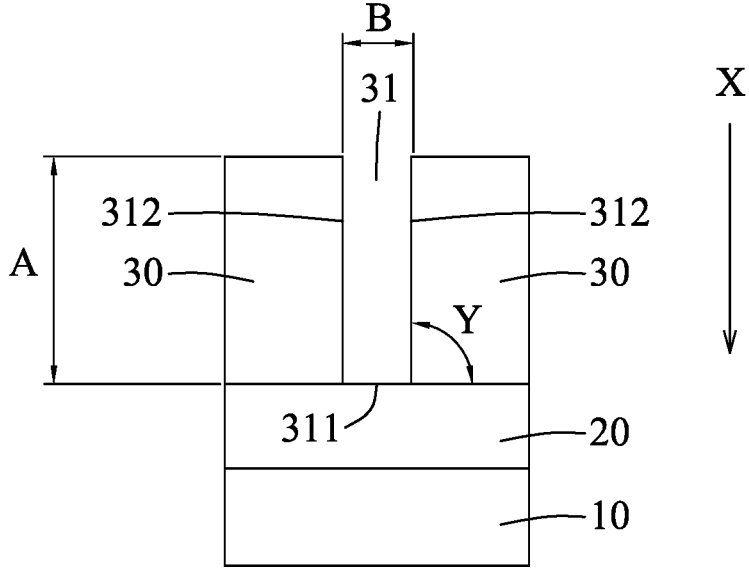
FIGS. 6 to 8 are schematic views illustrating various profiles of a recess formed between two adjacent ones of waveguide structures of a semiconductor device in an intermediate stage of the method as depicted in FIG. 1 in accordance with some embodiments.
Figure 7:
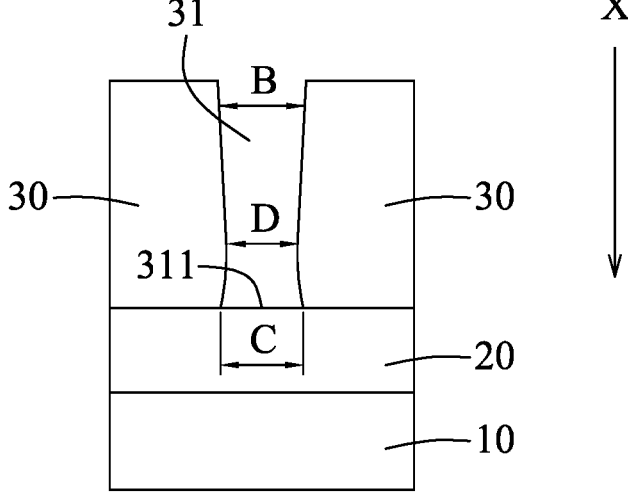
Figure 8:
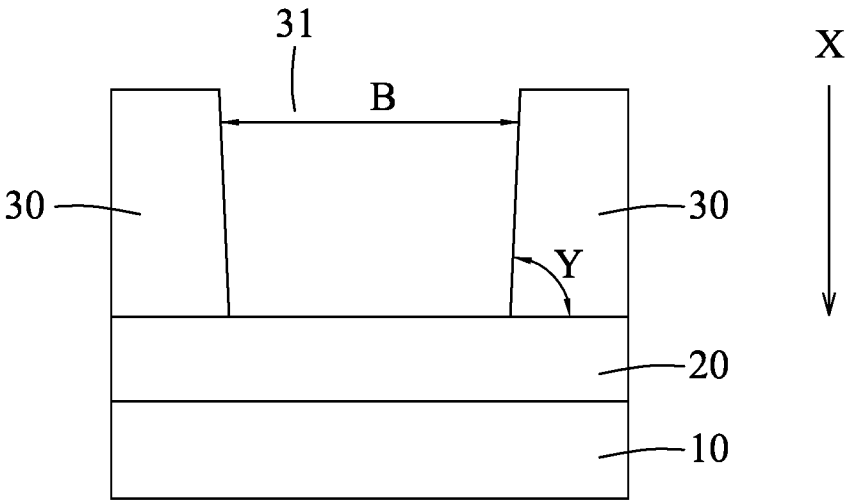

FIGS. 6 to 8 are schematic views illustrating various profiles of the recess 31 formed between two adjacent ones of the waveguide structures 30 of the semiconductor device 200 in accordance with some embodiments. Referring to the example illustrated in FIG. 6, the recess 31 includes a bottom surface 311 and two opposite sidewall surfaces 312 extending upwardly from two opposite ends of the bottom surface 311. The recess 31 has a depth (A) (i.e., a vertical height of the sidewall surfaces 312) ranging from about 2 micrometer (m) to about 4 μm and a width (B) (i.e., a horizontal distance between the sidewall surfaces 312) ranging from about 0.6 μm to about 20 μm. The width (B) is substantially the same along a depth direction (X) from an upper end toward a lower end of the recess 31. An aspect ratio (i.e., a ratio of A to B) of the recess 31 is greater than about 0 and up to about 10. It the depth (A) is greater than 4 μm, the width (B) is greater than 20 μm, or the aspect ratio is greater than 10, the spacers 60 may be formed with voids. In some embodiments, the aspect ratio ranges from about 5 to 10.

Referring to the example illustrated in FIG. 7, the width (B) of the recess 31 decreases gradually and then increases gradually along the depth direction (X), such that a smallest width (D) of the recess 31 is formed in a middle portion of the recess 31. The bottom surface 311 of the recess 31 has a width (C). An undercut ratio is defined as a difference value between C and D divided by 2 (i.e., (C−D)/2), and is greater than about 0 nm and up to about 100 nm. It the undercut ratio is greater than 100 nm, the spacers 60 may be formed with voids.

Referring to the example illustrated in FIG. 8, the width (B) of the recess 31 decreases gradually along the depth direction (X). Referring to the examples illustrated in FIGS. 6 and 8, a sidewall surface and a bottom surface of the each of the waveguide structures 30 forms a sidewall angle (Y) therebetween. In some embodiments, the sidewall angle (Y) is greater than 0° and up to 90°.

Figure 9:
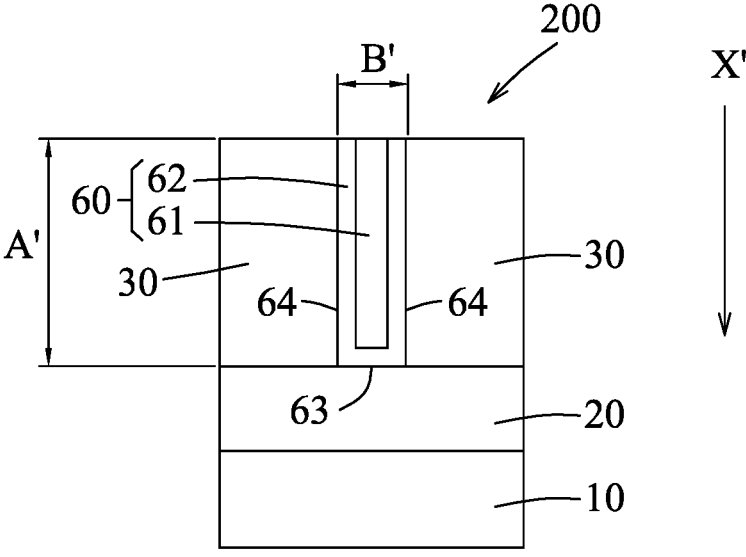
FIGS. 9 to 11 are schematic views illustrating various profiles of a spacer formed between two adjacent ones of waveguide structures of a semiconductor device manufactured by the method as depicted in FIG. 1 in accordance with some embodiments.
Figure 10:
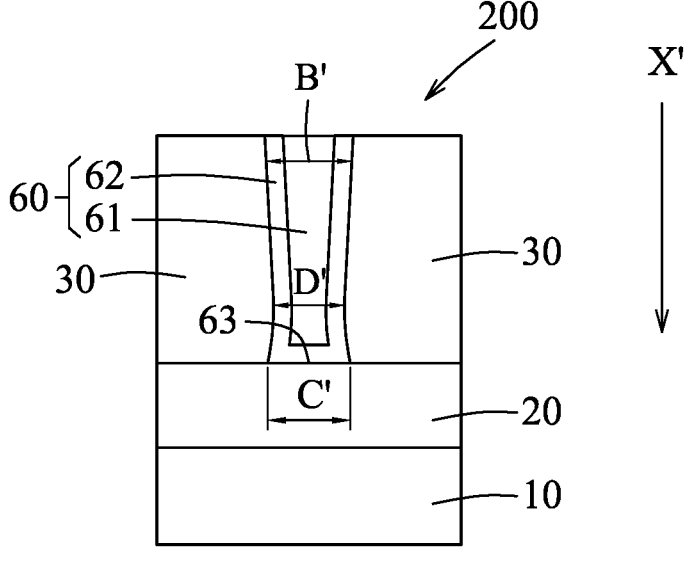
Figure 11:
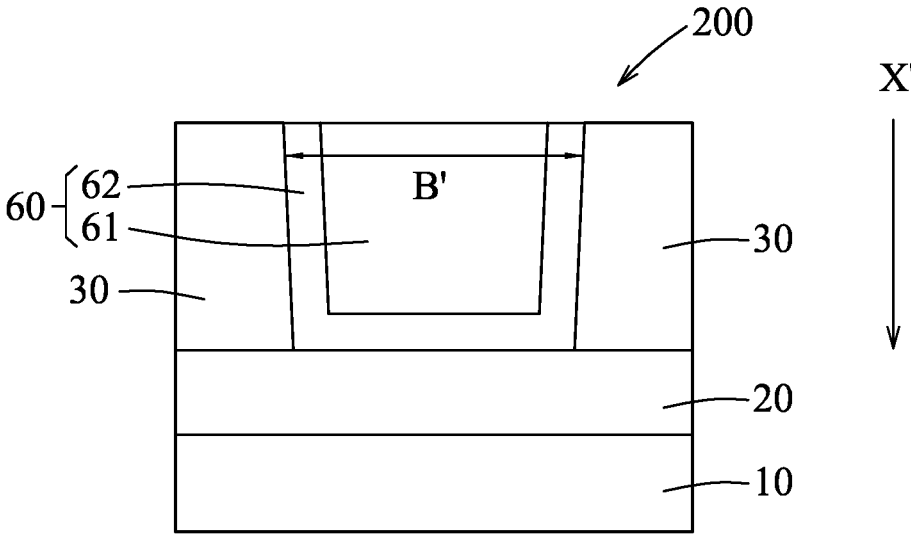

FIGS. 9 to 11 are schematic views illustrating various profiles of the spacer 60 formed between two adjacent ones of the waveguide structures 30 of the semiconductor device 200 in accordance with some embodiments. Referring to the example illustrated in FIG. 9, the spacer 60 includes a bottom surface 63 and two opposite sidewall surfaces 64 extending upwardly from two opposite ends of the bottom surface 63, and has a height (A') ranging from about 2 μm to about 4 μm and a width (B') (i.e., a horizontal distance between the sidewall surfaces 64) ranging from about 0.6 μm to about 20 μm. The width (B') is substantially the same along a longitudinal direction (X') from an upper end toward a lower end of the spacer 60. An aspect ratio (i.e., a ratio of A' to B') of the spacer 60 is greater than about 0 and up to about 10. In some embodiments, the aspect ratio of the spacer 60 ranges from about 5 to about 10. Referring to the example illustrated in FIG. 10, the width (B') of the spacer 60 decreases gradually and then increases gradually along the longitudinal direction (X'), such that a smallest width (D') of the spacer 60 is formed in a middle portion of the spacer 60. The bottom surface 63 of the spacer 60 has a width (C'). A value of (C−D)/2 is greater than about 0 nm and up to about 100 nm. Referring to the example illustrated in FIG. 11, the width (B') of the spacer 60 decreases gradually along the longitudinal direction (X').

Figure 12:
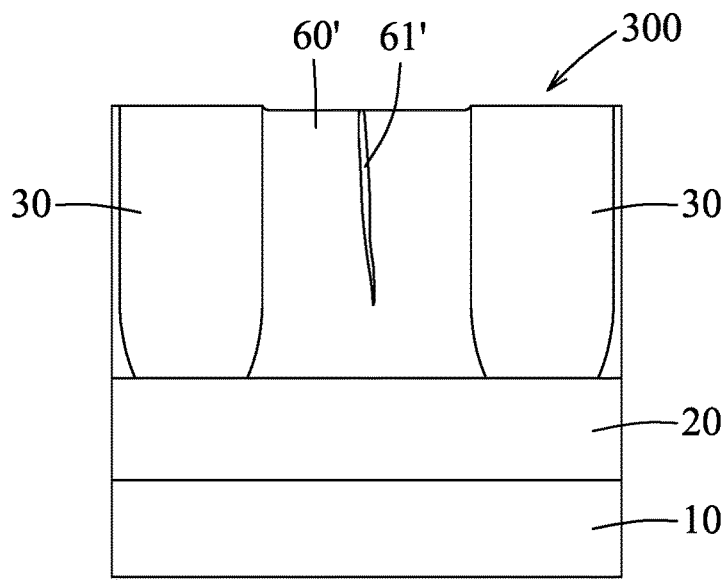
FIG. 12 is a schematic view illustrating a semiconductor device in which a spacer disposed between two adjacent ones of waveguide structures is formed by a high aspect ratio process.

FIG. 12 is a schematic view illustrating a semiconductor device 300, which has a configuration similar to that of the semiconductor device 200 shown in FIG. 5 in accordance with some embodiments of the present disclosure, and which includes the substrate 10; the first dielectric layer 20 disposed on the substrate 10; a plurality of the waveguide structures 30 disposed on the first dielectric layer 20 and spaced apart from each other; and a plurality of spacers 60', each of which is disposed on the first dielectric layer 20 to permit two adjacent ones of the waveguide structures 30 to be spaced apart from each other. One of the spacers 60' is shown in FIG. 12. The semiconductor device 300 may be manufactured by a method substantially the same as that described above with reference to FIG. 1, except that the spacers 60' are formed by the high aspect ratio process (HARP), in which a dielectric layer is conformally deposited to cover the waveguide structures 30 and the first dielectric layer 20, and two portions of the dielectric layer formed in a recess between two corresponding ones of the waveguide structures 30 merge with each other, thereby forming a merging line in each of the spacers 60'. When the semiconductor device 300 is further processed by a subsequent thermal process, for example, but not limited to, an annealing process, crack 61' may be formed from the merging line. In addition, voids (not shown) may undesirably exist in the spacers 60'. As described above with reference to FIG. 4, the filling layer 50 has a substantially low glass transition temperature (Tg) compared to that of the second dielectric layer 40. The gaps 44 can be fully filled with the filling layer 50 without formation of a merging line, such that the crack 61', which may be formed in the spacers 60' of the semiconductor device 300, can be avoided in the semiconductor device 200 in accordance with some embodiments of the present disclosure.

Figure 13:
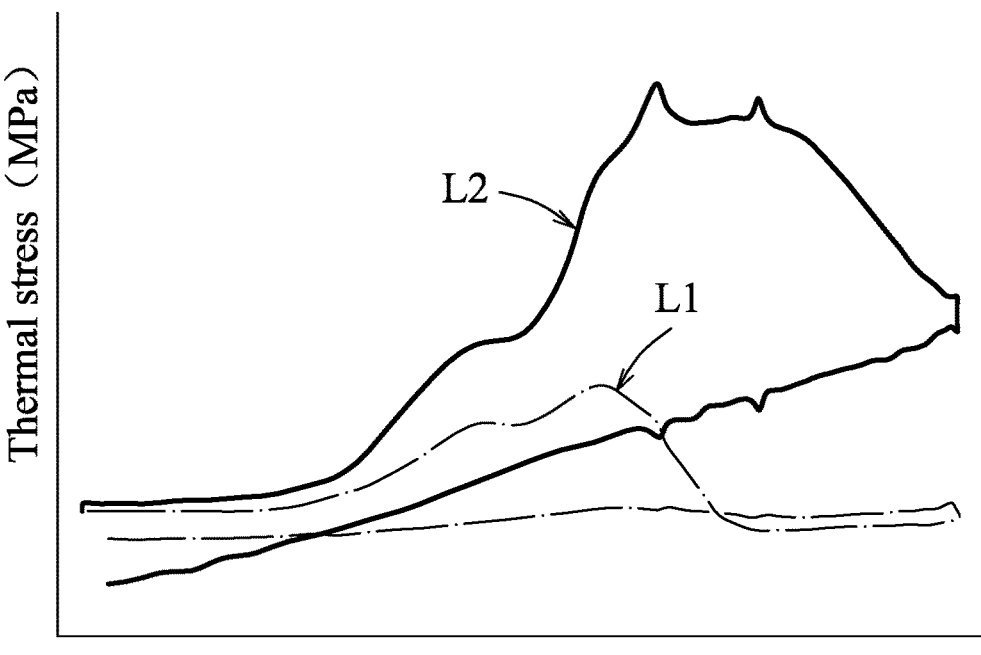
FIG. 13 illustrates a graph showing a thermal stress versus an anneal temperature of a semiconductor device in which a spacer disposed between two adjacent ones of waveguide structures is formed by a filling process used in the method as depicted in FIG. 1 in accordance with some embodiments, and that of another semiconductor device in which a spacer disposed between two adjacent ones of waveguide structures is formed by the high aspect ratio process.

FIG. 13 illustrates a graph showing a thermal stress versus an anneal temperature. Curve L1 shows variation of a thermal stress versus an anneal temperature for the semiconductor device 200 (see FIG. 5) in accordance with some embodiments of the present disclosure, in which the doped dielectric body 61 (for example, but not limited to, borophosphosilicate glass (BPSG)) is formed in each of the spacers 60. Curve L2 shows variation of a thermal stress versus an anneal temperature for the semiconductor device 300 (see FIG. 12), in which each of the spacers 60' does not include the doped dielectric body 61 as shown in FIG. 5. As shown in FIG. 13, a thermal stress generated in the doped dielectric body 61 is significantly lower than that generated in the spacer 60'. Therefore, the crack 61' formed in the semiconductor device 300 due to a high thermal stress generated during the annealing process may not be formed in the semiconductor device 200 in accordance with some embodiments of the present disclosure. The thermal stress generated in the doped dielectric body 61 during the annealing process may range from about 0 MPa to about 300 MPa. The thermal stress generated in the spacer 60' during the annealing process may range from about 200 MPa to about 1,000 MPa.

Figure 14:
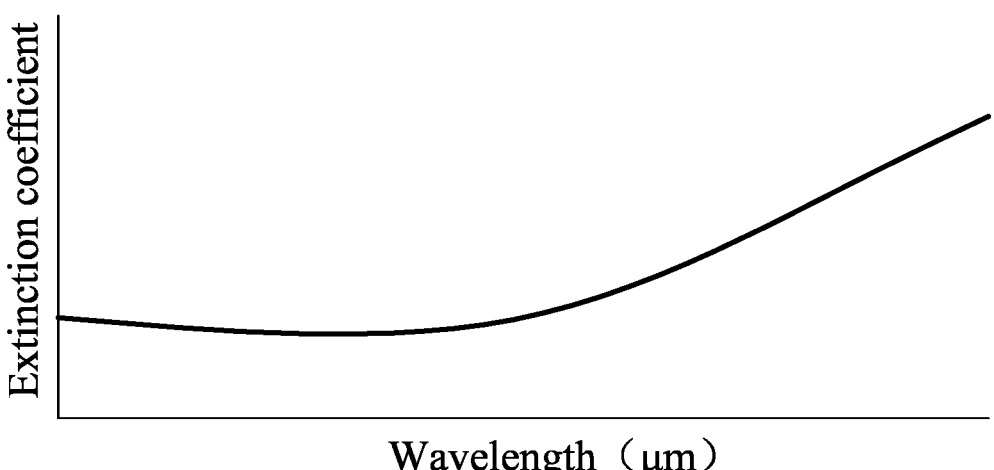
FIG. 14 illustrates a graph showing an extinction coefficient versus a wavelength of a doped dielectric body of a spacer disposed between two adjacent ones of waveguide structures of a semiconductor device in accordance with some embodiments.

FIG. 14 illustrates a graph showing an extinction coefficient versus a wavelength of the doped dielectric body 61 (for example, but not limited to, borophosphosilicate glass (BPSG)) formed in each of the spacers 60 of the semiconductor device 200 (see FIG. 5). As shown in FIG. 14, an extinction coefficient of the doped dielectric body 61 increases for light having a certain range of wavelength, indicating that the doped dielectric body 61 formed in each of the spacers 60 of the semiconductor device 200 can absorb light with the certain range of wavelength. In some embodiments, the doped dielectric body 61 formed in each of the spacers 60 of the semiconductor device 200 can absorb light having a wavelength ranging from about 1900 nm to about 2200 nm.

Figure 15:
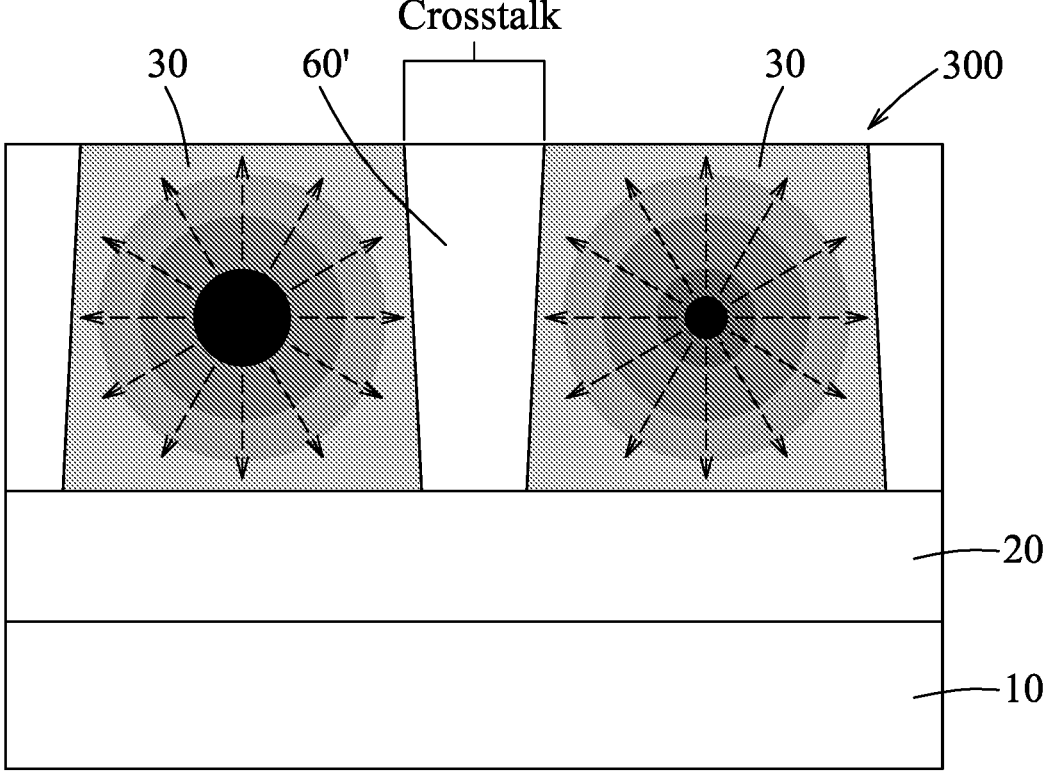
FIG. 15 is a schematic view illustrating a crosstalk effect that occurs between two adjacent ones of the waveguide structures of the semiconductor device illustrated in FIG. 12.
Figure 16:
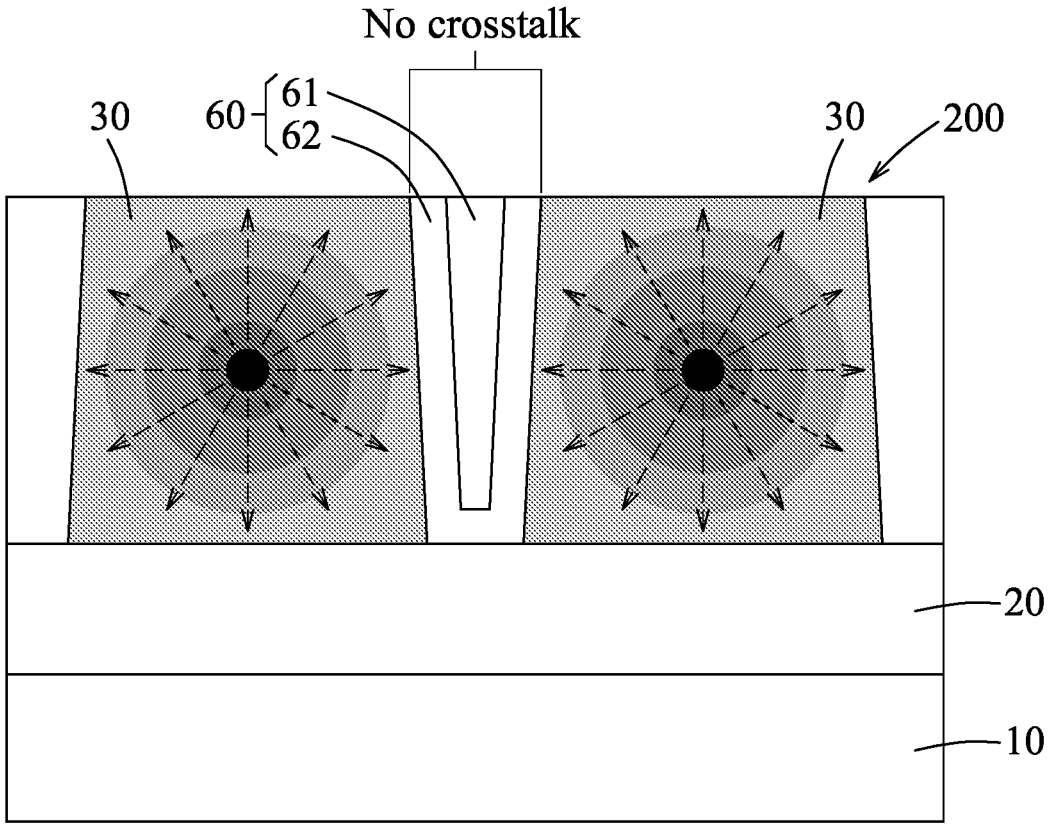
FIG. 16 is a schematic view illustrating no crosstalk effect occurs between two adjacent ones of the waveguide structures of the semiconductor device illustrated in FIG. 5 in accordance with some embodiments of the present disclosure.

FIG. 15 is a schematic view illustrating a crosstalk effect that may undesirably occur between two adjacent ones of the waveguide structures 30 of the semiconductor device 300, in which each of the spacers 60' does not include the doped dielectric body 61 as shown in FIG. 5. FIG. 16 is a schematic view illustrating that no crosstalk effect occurs between two adjacent ones of the waveguide structures 30 of the semiconductor device 200 in accordance with some embodiments of the present disclosure, in which each of the spacers 60 includes the doped dielectric body 61. As described above, the doped dielectric body 61 formed in each of the spacers 60 of the semiconductor device 200 can absorb light with the certain range of wavelength. Therefore, no crosstalk effect occurs between two adjacent ones of the waveguide structures 30 of the semiconductor device 200.

In a semiconductor device of the present disclosure, a spacer disposed between two corresponding ones of a plurality of waveguide structures on a substrate is formed by conformally forming an un-doped dielectric layer to cover the waveguide structures and to form a gap between two corresponding portions of the un-doped dielectric layer laterally covering the two corresponding ones of the waveguide structure, respectively, and forming a doped filling layer to fill the gap. The doped fill layer is formed by sub-atmospheric CVD using a filling material which is in a flowable form during the sub-atmospheric CVD, such that the gap can be fully filled with the doped filling layer without formation of voids. In addition, a thermal stress generated in the semiconductor device of the present disclosure can be reduced by formation of the doped filling layer, such that the semiconductor device of the present discourse will not crack in a thermal process conducted after formation of the spacer.

In accordance with some embodiments of the present disclosure, a method for manufacturing a semiconductor device includes: forming a first waveguide structure and a second waveguide structure on a substrate, in which the first waveguide structure and the second waveguide structure are spaced apart from each other by a recess; conformally forming an un-doped dielectric layer to cover the first and second waveguide structures and to form a gap between two corresponding portions of the un-doped dielectric layer laterally covering the first waveguide structure and the second waveguide structure, respectively; and forming a doped filling layer to fill the gap.

In accordance with some embodiments of the present disclosure, the doped filling layer is formed by sub-atmospheric chemical vapor deposition.

In accordance with some embodiments of the present disclosure, the doped filling layer is formed using a silicon-containing precursor, an oxygen-containing precursor, and at least one of a boron-containing precursor and a phosphorus-containing precursor.

In accordance with some embodiments of the present disclosure, the silicon-containing precursor includes tetraethyl orthosilicate.

In accordance with some embodiments of the present disclosure, the oxygen-containing precursor includes oxygen gas, ozone, or a combination thereof.

In accordance with some embodiments of the present disclosure, the boron-containing precursor includes triethyl borate.

In accordance with some embodiments of the present disclosure, the phosphorus-containing precursor includes triethyl phosphate.

In accordance with some embodiments of the present disclosure, the un-doped dielectric layer has a thickness ranging from about 50 nm to about 300 nm.

In accordance with some embodiments of the present disclosure, a method for manufacturing a semiconductor device includes: forming a first waveguide structure and a second waveguide structure on a substrate, in which the first waveguide structure and the second waveguide structure are spaced apart from each other by a recess; conformally forming an un-doped dielectric layer to cover the first and second waveguide structures, in which the un-doped dielectric layer includes a lower portion disposed on the substrate, two upper portions respectively disposed on the first and second waveguide structures, and two interconnecting portions, each of which interconnects the lower portion and a corresponding one of the upper portions and laterally covers a corresponding one of the first and second waveguide structures so as to form a gap between the two interconnecting portions; forming a doped filling layer to fill the gap; and removing an upper portion of the doped filling layer and the upper portions of the un-doped dielectric layer over the first and second waveguide structures.

In accordance with some embodiments of the present disclosure, the recess has a depth ranging from about 2 μm to about 4 μm.

In accordance with some embodiments of the present disclosure, the recess has a width ranging from about 0.6 μm to about 20 μm.

In accordance with some embodiments of the present disclosure, the recess has an aspect ratio which is greater than about 0 and up to about 10.

In accordance with some embodiments of the present disclosure, the recess has a width which is the same along a depth direction from an upper end toward a lower end of the recess.

In accordance with some embodiments of the present disclosure, the recess has a width which decreases gradually and then increases gradually along a depth direction from an upper end toward a lower end of the recess, such that a smallest width (D) of the recess is formed in a middle portion of the recess.

In accordance with some embodiments of the present disclosure, the recess has a bottom surface having a width (C). An undercut ratio defined as a difference value between C and D divided by 2 is greater than about 0 nm and up to about 100 nm.

In accordance with some embodiments of the present disclosure, the recess has a width which decreases gradually along a depth direction from an upper end toward a lower end of the recess.

In accordance with some embodiments of the present disclosure, a sidewall surface and a bottom surface of each of the first and second waveguide structures form a sidewall angle therebetween. The sidewall angle is greater than about 0° and up to about 900.

In accordance with some embodiments of the present disclosure, a semiconductor device includes a substrate, a first waveguide structure and a second waveguide structure disposed on the substrate, and a spacer disposed on the substrate to separate the first waveguide structure from the second waveguide structure. The spacer includes a doped dielectric body disposed between the first waveguide structure and the second waveguide structure, and an un-doped dielectric layer disposed to separate the doped dielectric body from the first and second waveguide structures.

In accordance with some embodiments of the present disclosure, the doped dielectric body includes a dielectric material doped with a dopant selected from boron, phosphorus, or a combination thereof.

In accordance with some embodiments of the present disclosure, the doped dielectric body includes boron in a content of greater than about 0 wt % and up to about 20 wt % and phosphorus in a content of greater than about 0 wt % and up to about 20 wt %.

The foregoing outlines features of several embodiments so that those skilled in the art may better understand the aspects of the present disclosure. Those skilled in the art should appreciate that they may readily use the present disclosure as a basis for designing or modifying other processes or structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for manufacturing a semiconductor device comprising:
   forming a first waveguide structure and a second waveguide structure on a substrate, the first waveguide structure and the second waveguide structure being spaced apart from each other by a recess;
   conformally forming an un-doped dielectric layer to cover the first waveguide structure and the second waveguide structure and to form a gap between two corresponding portions of the un-doped dielectric layer laterally covering the first waveguide structure and the second waveguide structure, respectively; and
   forming a doped filling layer to fill the gap,
   wherein the recess has a width which decreases gradually and then increases gradually along a depth direction from an upper end toward a lower end of the recess, such that a smallest width (D) of the recess is formed in a middle portion of the recess.

2. The method according to claim 1, wherein the doped filling layer is formed by sub-atmospheric chemical vapor deposition.

3. The method according to claim 1, wherein the doped filling layer is formed using a silicon-containing precursor, an oxygen-containing precursor, and at least one of a boron-containing precursor and a phosphorus-containing precursor.

4. The method according to claim 3, wherein the silicon-containing precursor includes tetraethyl orthosilicate.

5. The method according to claim 3, wherein the oxygen-containing precursor includes oxygen gas, ozone, or a combination thereof.

6. The method according to claim 3, wherein the boron-containing precursor includes triethyl borate.

7. The method according to claim 3, wherein the phosphorus-containing precursor includes triethyl phosphate.

8. A method for manufacturing a semiconductor device comprising:
   forming a waveguide-forming material layer on a substrate;
   patterning the waveguide-forming material layer to simultaneously form a first waveguide structure and a second waveguide structure on the substrate, the first waveguide structure and the second waveguide structure being spaced apart from each other by a recess;

conformally forming an un-doped dielectric layer to cover the first waveguide structure and the second waveguide structure, the un-doped dielectric layer including a lower portion disposed on the substrate, two upper portions respectively disposed on the first waveguide structure and the second waveguide structure, and two interconnecting portions, each of which interconnects the lower portion and a corresponding one of the two upper portions and laterally covers a corresponding one of the first waveguide structure and the second waveguide structure so as to form a gap between the two interconnecting portions;

forming a doped filling layer to fill the gap; and removing an upper portion of the doped filling layer and the two upper portions of the un-doped dielectric layer over the first waveguide structure and the second waveguide structure.

9. The method according to claim 8, wherein the recess has a depth ranging from 2 μm to 4 μm.

10. The method according to claim 8, wherein the recess has a width ranging from 0.6 μm to 20 μm.

11. The method according to claim 8, wherein the recess has an aspect ratio which is greater than 0 and up to 10.

12. The method according to claim 8, wherein the recess has a width which is the same along a depth direction from an upper end toward a lower end of the recess.

13. The method according to claim 8, wherein the recess has a width which decreases gradually and then increases gradually along a depth direction from an upper end toward a lower end of the recess, such that a smallest width (D) of the recess is formed in a middle portion of the recess.

14. The method according to claim 13, wherein the recess has a bottom surface having a width (C), an undercut ratio defined as a difference value between C and D divided by 2 being greater than 0 nm and up to 100 nm.

15. The method according to claim 8, wherein the recess has a width which decreases gradually along a depth direction from an upper end toward a lower end of the recess.

16. The method according to claim 8, wherein a sidewall angle is formed between a sidewall surface and a bottom surface of each of the first waveguide structure and the second waveguide structure, the sidewall angle being greater than 0° and up to 90°.

17. A semiconductor device comprising:

a substrate;

a first waveguide structure and a second waveguide structure disposed on the substrate; and a spacer disposed on the substrate to separate the first waveguide structure from the second waveguide structure and including:

a doped dielectric body disposed between the first waveguide structure and the second waveguide structure, and an un-doped dielectric layer disposed to separate the doped dielectric body from the first waveguide structure and the second waveguide structure, wherein the spacer directly interfaces the first waveguide structure and the second waveguide structure.

18. The semiconductor device according to claim 17, wherein the doped dielectric body includes a dielectric material doped with a dopant selected from boron, phosphorus, or a combination thereof.

19. The semiconductor device according to claim 18, wherein the doped dielectric body includes boron in a content of greater than 0 wt % and up to 20 wt % and phosphorus in a content of greater than 0 wt % and up to 20 wt %.

20. The semiconductor device according to claim 17, further comprising a dielectric layer disposed on the substrate and directly interfacing the first waveguide structure and the second waveguide structure.

* * * * *